(12) United States Patent
Li et al.

(10) Patent No.: US 6,221,978 B1
(45) Date of Patent: Apr. 24, 2001

(54) MOISTURE CURABLE HOT MELT ADHESIVE AND METHOD FOR BONDING SUBSTRATES USING SAME

(75) Inventors: Yingjie Li, Batavia, IL (US); Reimar Heucher, Pulheim (DE); John T. Cain, Geneva, IL (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/288,899

(22) Filed: Apr. 9, 1999

Related U.S. Application Data

(60) Provisional application No. 60/081,222, filed on Apr. 9, 1998.

(51) Int. Cl.[7] .......................... C08G 18/00; C08G 65/32; C08F 20/00; C08L 71/02; C09J 4/00
(52) U.S. Cl. .......................... 525/452; 156/325; 156/327; 156/330; 156/331.4; 524/589; 524/590; 525/403; 525/440; 528/44; 528/65; 528/66; 528/80; 528/83; 528/84; 528/85
(58) Field of Search ...................... 524/589, 590; 528/44, 65, 66, 80, 83, 84, 85; 156/331.4, 325, 327, 330; 525/403, 440, 452

(56) References Cited

U.S. PATENT DOCUMENTS

| | | |
|---|---|---|
| 4,206,299 | 6/1980 | Yamazaki et al. ................ 528/288 |
| 4,503,189 | 3/1985 | Igarashi et al. . |
| 4,843,119 | 6/1989 | Schapira et al. . |
| 5,019,638 | 5/1991 | Müller et al. . |
| 5,034,453 | 7/1991 | Takada et al. . |
| 5,115,073 | 5/1992 | Meckel et al. . |
| 5,166,300 | 11/1992 | Rumon et al. ........................ 528/65 |
| 5,232,996 | 8/1993 | Shah et al. . |
| 5,599,895 | 2/1997 | Heider . |
| 5,721,311 | 2/1998 | Oien . |
| 5,731,090 | 3/1998 | Chen . |
| 5,827,926 | 10/1998 | Shimizu . |
| 5,869,593 | 2/1999 | Helmeke et al. . |
| 5,880,167 | 3/1999 | Krebs et al. . |

OTHER PUBLICATIONS

*Technical Information,* RUCO Polymer Corporation, Apr. 1984, 1 pg.
*Rubinate® 44 Product Description,* ICI Polyurethanes, Jan. 1993, 1 pg.
*The Rucoflex Polyester Selector Guide,* RUCO Polymer Corporation, May 1995, 9 pgs.
*Fomrez® Polyester Polyols,* 2 pgs. (Publication Date Unknown).
*Dynacoll® 7000 Copolyesters,* Hüls, 10 pgs. (Publication Date Unknown).
*Product Information,* Dynacoll 7350–7110, Hüls, 12 pgs., May 1990.

*Primary Examiner*—Patrick D. Niland
(74) *Attorney, Agent, or Firm*—Wayne C. Jaeschke; Stephen D. Harper

(57) ABSTRACT

Difficult-to-bond substrates possessing low surface energies are bonded with moisture curable polyurethane hot melt adhesive comprising a polyurethane prepolymer which is the reaction product of a polyol component and a polyisocyanate component, wherein said polyol component comprises a polyester polyol which is the reaction product of diacid comprising aromatic diacid and optional co-monomer diacid and diol, with the proviso that said diacid is substantially free of phthalic acid or derivatives thereof.

110 Claims, No Drawings

MOISTURE CURABLE HOT MELT ADHESIVE AND METHOD FOR BONDING SUBSTRATES USING SAME

This application claims the benefit of U.S. Provisional Application No. 60/081,222 filed Apr. 9, 1998.

BACKGROUND OF THE INVENTION

This invention relates to a moisture curable polyurethane hot melt adhesive and to a method of bonding substrates using the adhesive. In particular, this invention relates to a one component moisture curable polyurethane hot melt adhesive useful for bonding low surface energy substrates such as difficult-to-bond acrylonitrile-butadiene-styrene (ABS) substrates.

Moisture curable polyurethane hot melt adhesives are substantially solvent-free solids at room temperature that bond after application in the form of their melts by cooling and curing by the chemical reaction of isocyanate groups with moisture. Upon curing, the molecule size increases and the adhesive obtains its final characteristics.

Although suitable for many applications, moisture curable polyurethane hot melt adhesives have demonstrated limited ability to bond to certain low surface energy substrates, in particular difficult-to-bond ABS. ABS polymers are elastomeric and thermoplastic composites that exhibit excellent toughness. This property allows ABS to be used in a variety of applications making it one of the largest selling thermoplastics. A more complete description of the properties of ABS may be found in the *Encyclopedia of Polymer Science and Engineering,* Vol. 1:388–426 (Wiley, 1985).

Because of differences in its composition and production, not all grades of ABS are alike. While some ABS substrates are relatively easy to bond with moisture curable polyurethane hot melt adhesives, those skilled in the art generally recognize that many ABS substrates, referred to herein as difficult-to-bond ABS, are a challenge for polyurethane hot melt adhesives. For example, ABS substrates sold by Spartech Plastics, La Mirada, Calif. and Gage Plastics, Lake Oswego, Oreg. cannot be bonded with conventional moisture curable polyurethane hot melt adhesives.

While the reason for this shortcoming is not entirely clear, it is believed that the low surface energy of Spartech or Gage ABS renders it extremely difficult to bond with conventional polyurethane hot melt adhesives. Another possibility is that oil, mold release agent, and other possibly low molecular weight contaminants which may be used in the production process of ABS contribute to the difficulty of bonding ABS with polyurethane hot melt adhesives.

Thus, a moisture curable polyurethane hot melt adhesive that bonds to low surface energy substrates such as difficult-to-bond ABS, polyethylene, polypropylene, aluminum, and steel, as well as other substrates such as fiber-reinforced plastic, plywood, paper board, and the like, is highly desired.

SUMMARY OF THE INVENTION

It has surprisingly been discovered that moisture curable polyurethane hot melt adhesives derived from polyester polyols obtained from the reaction of diacid and diol, wherein the diacid comprises at least one aromatic diacid which is selected from the group consisting of isophthalic acid and terephthalic acid, bond well to low surface energy substrates such as difficult-to-bond ABS and corrugated polypropylene. In contrast, moisture curable polyurethane hot melt adhesives containing polyester polyols derived from the reaction product of diacid and diol, wherein the diacid comprises phthalic acid or derivatives thereof, tend to bond poorly to low surface energy substrates. The reason(s) for this are not presently understood. The inventors have discovered that the substantial exclusion of phthalic acid from the diacid utilized to fabricate the polyester polyol results in a moisture curable polyurethane hot melt adhesive that is versatile and can be used to bond a wide variety of substrate materials including fiber-reinforced plastic, plywood, paper board, and the like, and demonstrates substantially improved adhesion to low surface energy substrates such as difficult-to-bond ABS, polyethylene, polypropylene, aluminum, and steel. Accordingly, this invention relates to a moisture curable polyurethane hot melt adhesive composition which comprises a polyurethane prepolymer which is the reaction product of a polyol component and a polyisocyanate component, said polyol component comprising a polyester polyol which is the reaction product of diacid and diol, said diacid comprising at least one aromatic diacid and optionally co-monomer diacid(s), with the proviso that said diacid is substantially free of phthalic acid or derivatives thereof. This invention also relates to a method of bonding a substrate such as difficult-to-bond ABS or corrugated polypropylene, which comprises applying to a surface of such substrate the moisture curable polyurethane hot melt adhesive of this invention.

In accordance with preferred embodiments, the polyol component present in the moisture curable hot melt adhesive further comprises a crystalline polyester polyol component to improve green strength, a flexible polyol component to improve low temperature adhesion, an amorphous polyester polyol component to improve bonding to polar substrates, and/or an epoxy resin to improve adhesion to steel, aluminum, polyethylene, and polypropylene.

The phrase "substantially free" as applied to diacid(s) utilized in the preparation of polyester polyol shall be understood to refer to the possibility that minor amounts of o-phthalic acid or derivatives thereof may be present in technical grades of aromatic diacids, in particular, isophthalic acid and terephthalic acid. Such amounts are believed to represent not more than about 10 weight percent of the technical grades of such aromatic diacids. The use of such technical grades is accordingly within the scope of the invention.

The term "phthalic acid" as utilized herein shall be understood to mean ortho-phthalic acid and derivatives, e.g., the anhydride, thereof.

The term "diacid" as utilized herein shall be understood to include derivatives thereof including the anhydride, halides, and alkyl esters thereof.

The phrase "low surface energy" as utilized herein shall be understood to mean a substrate possessing a surface energy of less than 38 dyne as determined using AccuDyne® test marker pens from Diversified Enterprises, Claremont, N.H.

Other than in the examples, or where otherwise indicated, all numbers expressing quantities of ingredients or reaction conditions used herein are to be understood as modified in all instances by the term "about".

DESCRIPTION OF THE PREFERRED EMBODIMENTS

The polyurethane prepolymer utilized in the hot melt adhesive of the invention is prepared by reacting a polyol component comprising a specific polyester polyol with a molar excess of a polyisocyanate component possessing two or more isocyanate groups to form an isocyanate-terminated polyurethane prepolymer which cures upon exposure to moisture.

The polyester polyol is prepared by reacting diacid comprising an aromatic diacid and optionally co-monomer diacid(s) with diol. The critical feature of the invention is that the diacid must be substantially free of phthalic acid. Suitable aromatic diacid which can be employed in the practice of this invention include terephthalic acid, isophthalic acid, derivatives thereof, and mixtures thereof Preferably, the aromatic diacid is isophthalic acid. The diacid optionally can further include diacid co-monomer(s) such as aliphatic diacids and/or cycloaliphatic diacids. Aliphatic diacids include dodecanedioic acid, succinic acid, glutaric acid, adipic acid, azelaic acid, sebacic acid, decanedicarboxylic acid, octadecanedicarboxylic acid, 1,4-cyclohexanedicarboxylic acid, dimerized fatty acids, fumaric acid, derivatives thereof, and the like. Cycloaliphatic diacids include 1,3-cyclohexane dicarboxylic acid, 1,4-cyclohexanedicarboxylic acid, and the like. The preferred diacid co-monomer is adipic acid. Preferably, the diacid comprises isophthalic acid and adipic acid in a weight ratio of isophthalic acid to adipic acid of from about 30:70 to about 70:30, more preferably, about 50:50 based on the combined weight of isophthalic acid and adipic acid.

Diols useful in the practice of this invention include ethylene glycol, 1,2-propanediol, 1,3-propanediol, 1,3-butanediol, 1,5-pentanediol, 1,4-hexanediol, 1,6-hexanediol, 1,10-decandediol, neopentyl glycol, diethylene glycol, polyethylene glycol, dipropylene glycol, polypropylene glycol, 1,4-cyclohexane dimethanol, 1,4-cyclohexanediol, bisphenol-A, bisphenol-F, hydrogenated bisphenol-A, hydrogenated bisphenol-F, and the like. Combinations of two or more of these diols can be employed. The preferred diol is 1,6-hexanediol.

Examples of commercially available polyester polyols which are substantially free of o-phthalic acid are RUCOFLEX® polymers sold under the designations S-1014, S-1019, S-1021, S-1022, S-1035, and S-1095 available from Ruco Polymer Corporation, Hicksville, N.Y., and FORMREZ® polymers sold under the designations 8012–56, 8056–93, 8056–146, 8066–35, 8066–72, and 8066–120 available from Witco Corporation, Houston, Tex.

The amount of the polyester polyol will typically range from about 10 to about 90, preferably from about 30 to about 80, weight percent of the moisture curable polyurethane hot melt adhesive of this invention.

Polyisocyanate compounds useful in the practice of this invention include 1,4-diisocyanatobenzene (PPDI), toluene diisocyanate (TDI), 4,4'-diphenylmethane diisocyanate (4,4'-MDI), 2,4'-diphenylmethane diisocyanate (2,4'-MDI ), polymethylene poly(phenyl isocyanate) (PMDI), 1,5-naphthalene diisocyanate (NDI), bitolylene diisocyanate (TODI), 1,3-xylene diisocyanate (XDI),p-1,1,4,4-tetramethylxylene diisocyanate (p-TMXI), m-1,1,3,3-tetramethylxylylene diisocyanate (m-TMXDI), 1,6-diisocyanato-2,4,4-trimethylhexane, 1,4-cyclohexane diisocyanate (CHDI), 1,4-cyclohexanebis(methylene isocyanate) (BDI), 1,3-bis(isocyanatomethyl)cyclohexane ($H_6$XDI), 3-isocyanatomethyl-3,5,5-trimethylcyclohexyl isocyanate (IPDI), dicyclohexylmethane diisocyanate ($H_{12}$MDI), triphenylmethane -4,4', 4"-triisocyanate, and the like. Mixtures of polyisocyanates, e.g., 2,4'-MDI and 4,4'-MDI, may be used. Optionally, modified polyisocyanates such as isocyanate-terminated prepolymers prepared by reacting any of the above polyisocyanates with a substoichiometric amount of an isocyanate-reactive compound may be used. Suitable organic compounds for the formation of prepolymers include, for example, polyether polyols or polyester polyols which contain 1 to 4 hydroxyl groups and have molecular weights of from about 60 to about 1,400. The preferred polyisocyanate is substantially pure 4,4'-diphenylmethane diisocyanate commercially available under the trade name Rubinate® 44 from ICI Polyurethanes Group, West Deptford, N.J.

The amount of polyisocyanate will typically represent from about 8 to about 25, preferably from about 10 to about 20, weight percent of the moisture curable hot melt adhesive of this invention.

In accordance with a preferred embodiment, the polyol component of the moisture curable polyurethane hot melt adhesive of the invention further comprises one or more of the following polyols: crystalline polyester polyol to improve green strength, a flexible polyol to improve low temperature adhesion, and/or an amorphous polyester polyol to improve bonding to polar substrates. It will be understood that, when employed, such polyols will be substantially free of phthalic acid or derivatives thereof.

The crystalline polyol is a solid at 25° C. and posses a glass transition temperature ($T_g$) well below 0° C. The crystalline polyol can include a polyester polyol and/or a polyurethane polyol. When it is a polyester polyol, the crystalline polyol can comprise the reaction product of an aliphatic diol having from 2 to 10 methylene groups and an aliphatic diacid having from 2 to 10 methylene groups. When it is a polyurethane polyol, the crystalline polyol can comprise the reaction product of polycaprolactone with a substoichiometric amount of MDI. Diols useful in forming the crystalline polyester polyol include ethylene glycol, 1,4butanediol, 1,5-pentanediol, 1,6-hexanediol, 1,8-octanediol, and 1,10-decanediol. Cycloaliphatic diols such as 1,4-cyclohexanediol and 1,4-cyclohexanedimethanol can also be employed. Aliphatic diacids useful in preparing the crystalline polyester polyol include succinic acid, glutaric acid, adipic acid, sebacic acid, 1,12-dodecanedioic acid, dimerized fatty acids, derivatives thereof, and mixtures thereof. Examples of suitable crystalline polyester polyols which can be utilized in the practice of this invention include poly(hexanediol adipate) polyol, poly(butanediol adipate) polyol, poly ε-caprolactone polyol, polyhexanediol dodecanedioic acid) polyol, and the like. Such crystalline polyester polyols are commercially available under the trade names DYNACOLL® 7300 series available from Hüls America, Inc., Piscataway, N.J. and such crystalline polyurethane polyols are commercially available under the tradenames Pearlstick® 508 and 501 available from Aries Technologies, Derry, N.H., a distributor of Merquinsa, Barcelona, Spain. When employed, crystalline polyols will typically represent from about 10 to about 60, preferably from about 20 to about 50, weight percent of the moisture curable polyurethane hot melt adhesive of this invention.

The flexible polyol can comprise a polyether polyol and/or polyester polyol. Flexible polyols are liquids at 25° and have a $T_g$ below 25° C. and can comprise the reaction product of a diol and a diacid. Diols useful in forming the flexible polyester polyol include hexanediol, butanediol, neopentyl glycol, ethylene glycol, diethylene glycol, propylene glycol, 2-methylpropanediol, and the like. Diacids useful in forming the flexible polyester polyol include adipic acid, isophthalic acid, terephthalic acid, and the like. Suitable flexible polyethers include polyethylene glycol, polytetramethylene glycol, polypropylene glycol, polybutadiene glycol, and the like, with a molecular weight from about 1,000 to about 4,000. Such polyether polyols are commercially available under the trade names ARCOL® PPG-1025, 2025, 3025, and 4025 from ARCO Chemical Company, Newtown Square, Pa. Suitable flexible polyester polyols which can be utilized in the practice of this invention are high viscosity liquid polyester polyols which are the reaction product of hexanediol, neopentyl glycol, and adipic acid and are commercially available under the trade name DYNACOLL® 7200 series from Hüls America, Inc., Piscataway, N.J. An example of a useful flexible polyester polyol is DYNACOLL® 7250 having a viscosity of about 6,000 mPa-sec at about 80° C. When employed, flexible polyol will typically represent from about 5 to about 45, preferably from about 10 to about 35, weight percent of the moisture curable hot melt adhesive of this invention.

The amorphous polyester polyols which can be utilized in the practice of this invention are solids at 25° C. and have a $T_g$ above 0° C. Such amorphous polyester polyols are the reaction product of diol and diacid. Diols useful in forming the amorphous polyester polyol include hexanediol, butanediol, neopentyl glycol, ethylene glycol, diethylene glycol, propylene glycol, 2-methylpropanediol, and the like. Diacids useful in forming the amorphous polyester polyol include adipic acid, isophthalic acid, terephthalic acid, and the like. Such amorphous polyester polyols are commercially available under the trade name DYNACOLL® 7100 series available from Hüls America, Inc. in Piscataway, N.J. An example of a useful amorphous polyester polyol is DYNACOLL® 7130, an amorphous copolyester having a $T_g$ of about 30° C. When employed, amorphous polyol(s) will typically represent from about 5 to about 35, preferably from about 5 to about 20, weight percent of the moisture curable polyurethane hot melt adhesive of this invention.

In accordance with another preferred embodiment, an epoxy resin is incorporated in order to improve the adhesion of the moisture curable hot melt adhesive to substrates, in particular, steel, aluminum, polyethylene and polypropylene. Useful epoxy resins are those compounds containing an average of more than one, and preferably at least two epoxy groups per molecule. The epoxy resin is either solid, semi-liquid or liquid at room temperature. Combinations of different types of epoxy resins can be used. Suitable epoxy resins include both monomeric and polymeric epoxy resins and can be aliphatic, cycloaliphatic, or aromatic, and blends thereof. Useful epoxy resins include phenolic epoxy resins, bisphenol epoxy resins, hydrogenated epoxy resins, halogenated bisphenol epoxy resins, novolac epoxy resins, and mixtures thereof. Preferred epoxy resins are those formed by the reaction product of bisphenol-A with epichlorohydrin.

Examples of suitable commercially available aromatic epoxy resins include the EPON® series of materials available from Shell Chemical Co., Houston, Tex. (e.g., EPON® 1071, EPON® HPT-1072, EPON® HPT-1079, EPON® 828, EPON® 1001, EPON® 2004, and EPON® 1510). When employed, epoxy resin will typically represent from about 1 to about 15, preferably from about 2 to about 10, weight percent of the moisture curable polyurethane hot melt adhesive of this invention.

The moisture curable polyurethane hot melt adhesive of this invention can contain conventional additives in appropriate amounts. These additives include dyes and pigments, curing catalysts, tackifiers, plasticizers, surfactants, flow agents, flame-retardants, silane compounds, dehydrating agents, and the like. Typically, these ingredients are added in small amounts of typically less than about 5% by weight of the composition and more typically less than about 2% by weight. When the other additives are used in an amount of more than about 5% by weight, the product tends to be inferior in characteristics and physical properties as required for an adhesive. Preferably the hot-melt adhesives of the invention do not contain any solvents, i.e., inert organic compounds having boiling points of up to 200° C. at normal pressure. Furthermore, the hot-melt adhesives of the invention preferably do not contain any inert fillers such as clays, carbonates, and titanium dioxide.

The polyol component and polyisocyanate component can be reacted to form a polyurethane prepolymer both in a single step and in multiple steps. In the multiple step process, for example, polyisocyanate is initially reacted with each polyol separately and the reaction products are then mixed together. It is also possible to initially react the polyisocyanate with only one of the polyols and to further react this pre-product in the presence of all the other polyols. Preferably, however, the polyurethane prepolymer of the invention is prepared using the single step process. To this end, the polyols of the polyol component are mixed first in a vessel and heated with agitation. The mixture is dehydrated at 110° C. to 130° C. for 60 minutes under vacuum. Thereafter, a molar excess of polyisocyanate is added to the mixture. The reaction is terminated when the desired isocyanate percentage is reached. The isocyanate percentage (NCO %) preferably ranges from about 0.5% to about 3.0%.

The viscosities of resultant compositions are generally less than about 50,000 cPs, preferably less than about 30,000 cPs, and more preferably less than about 25,000 cPs at 250° F. It will be readily understood that characteristics of the compositions such as viscosity, open time, green strength, and adhesion to polar substrates can be controlled to accommodate application conditions by varying the amounts of individual components. Such variations are within the ambit of the ordinary skilled artisan and involve routine experimentation.

As the polyurethane prepolymer has reactive NCO groups, the polyurethane hot melt adhesive is sensitive to airborne moisture. Therefore, it is necessary to protect it from moisture during storage. For this purpose, it is conveniently stored in a sealed, dry and moisture-proof container of aluminum, tinned sheet iron or composite sheets.

Preferably, the adhesive is coated in a thickness of from about 0.1 mm to about 0.5 mm using a roll coating machine. Following coating of one layer of hot-melt adhesive and prior to pressing together the surfaces to be bonded, the hot-met adhesive may also be cooled and the prefinished material may be stored as long as final curing is avoided. Prior to pressing together, the sample must be reheated above at least about 60° C.

Final curing may be carried out using various conditions. In particular, it is achieved through reaction with moisture from the atmosphere and/or in the substrates. Where relative humidity is 25% at 20° C. or less, the final curing will take at least 24 hours. Relative humidity should not be below 10% in order to obtain final curing within a period of from 3 to 7 days. In order to accelerate the curing reaction, the known polyurethane catalysts may be added, for example, diorganotin compounds such as dibutyltin dilaurate or a mercaptotin compound. Their amount ranges from 0 to about 0.05 percent by weight based on the weight of the entire composition.

The invention will be discussed in more detail below by way of example.

A) Materials Used

Rucoflex®S-101-455, available from Ruco Polymer Corp., was a partially crystalline copolyester glycol comprising the reaction product of adipic acid, isophthalic acid, and 1,6-hexane diol having an adipic acid to isophthalic acid content ratio of 50:50, a nominal molecular weight of about 2,000, and a melting point temperature of about 30° C.

Rucoflex® S-1028-55, available from Ruco Polymer Corp., was a liquid polyester glycol comprising the reaction product of 1,6- hexane diol and phthalic anhydride having a melting point of <20° C.

Rucoflex® 8822A, obtained from Ruco® Polymer Corp., Hicksville, N.Y., was a liquid polyester polyol.

Arcol® PPG2025, available from ARCO Chemical, was a polypropylene glycol having a molecular weight of about 2000.

Arcol® PPG3025, available from ARCO Chemical, was a polypropylene glycol having a molecular weight of about 3000.

Epon® 828, available from Shell Chemical Co., was an aromatic epoxy resin based on diglycidyl ether of bisphenol A.

Dynacoll® 7250, available from Hüls America, was a liquid copolyester polyol comprising the reaction product of adipic acid and 1,6-hexane diol having a molecular weight of about 5500 and a $T_g$ of about −50° C.

Dynacoll® 7340, available from Hüls America, was a crystalline copolyester polyol comprising the reaction product of terephthalic acid, adipic acid, and 1,6-hexanediol having a molecular weight of about 3500 and a melting point of about 96° C.

Dynacoll® 7360, available from Hüls America, was a crystalline copolyester polyol comprising the reaction product of adipic acid and 1,6-hexane diol having a molecular weight of about 3500 and a melting point of about 55° C.

Dynacoll® 7380, available from Hüls America, was a crystalline copolyester polyol comprising the reaction product of dodecanedioic acid and 1,6-hexane diol having a molecular weight of about 3500 and a melting point of about 70° C.

Pearlstick® 501, available from Aries Technologies, Derry, N.H., was a crystalline polyurethane polyol comprising the reaction product of polycaprolactone and MDI having a molecular weight around 37,000.

Pearlstick® 508, available from Aries Technologies, Derry, N.H., was a crystalline polyurethane polyol comprising the reaction product of polycaprolactone and MDI having a molecular weight around 37,000.

Rubinate® 44, available from ICI Polyurethanes Group, West Deptford, N.J., was a substantially pure 4,4'-diphenylmethane diisocyanate (MDI).

Perenol® F40, available from Henkel Corp., was a flow controller based on acrylate copolymers.

FC-430, available from 3M, St. Paul, Minn., was a fluorinated hydrocarbon wetting agent.

Dibutyltin dilaurate (DBTDL), available from Mooney Chemicals, Inc., Cleveland, Ohio, was a diorganotin catalyst compound.

B) Preparation

In the following Examples and Comparative Examples, Tables I and II, the polyurethane adhesives were prepared using the following method with only the relative amounts and specific types of reactants being changed for each example. All ingredients except for Rubinate 44 are added to a mixer and heated with agitation. The mixture is dehydrated under vacuum at about 110° C. to about 130° C. for 60 min. Then Rubinate 44 is added to the mixture. The reaction is stopped when the NCO % reaches the desired value. For examples where Pearlstick is utilized, Pearlstick 501 or 508 are mixed with the other polyols first. The mixture is heated up to about 175° C. to about 200° C. until a homogeneous melt is obtained. Then the rest of the ingredients except for Rubinate 44 are added and the mixture is dehydrated under vacuum at about 110° C. to about 130° C. for about 60 min. Then Rubinate 44 is added and reacted to the desired NCO %.

Following the reaction, the prepolymer is placed in a moisture-proof container.

C) Examination

A sample of the examples is heated to about 250° F. and extruded to a 1 inch by 2 inch strip of substrate. Another 1 inch by 2 inch strip is put on top of the coated sheet in a cross-over way to create a 1 inch by 1 inch bonded area. The bonded substrate is stored at ambient temperature and 40% relative humidity for 3 days before testing. After curing all specimens are then tested to determine qualitative strength.

Also, after curing of the adhesive, the bonded part is tested immediately (within 10 sec) after aging the part at 52° C. (high temperature adhesion test) or at −40° C. (low temperature adhesion test) for 2 hours.

The bonding strength is rated as not good if the bonded part can be separated easily; almost good if the part can be separated but with significant resistance; and good if the part cannot be separated without either damaging the sheet(s) or the adhesive.

TABLE I

| Component | Example 1 Weight (g) | Example 1 Weight Percent | Comparative Example 1 Weight (g) | Comparative Example 1 Weight Percent | Example 2 Weight (g) | Example 2 Weight Percent | Comparative Example 2 Weight (g) | Comparative Example 2 Weight Percent |
|---|---|---|---|---|---|---|---|---|
| Rucoflex ® S1014-55 | 750 | 50 | | | 150 | 10 | | |
| Rucoflex ® S1028-55 | | | 750 | 50 | | | 150 | 10 |
| Arcol ® PPG 2025 | | | | | 285 | 19 | 285 | 19 |
| Arcol ® PPG 3025 | 256.2 | 17.08 | 256.2 | 17.08 | | | | |
| Dynacoll ® 7360 | 270 | 18 | 270 | 18 | 285 | 19 | 285 | 19 |
| Dynacoll ® 7380 | | | | | 135 | 9 | 135 | 9 |
| Pearlstick ® 501 | | | | | 150 | 10 | 153 | 10.2 |
| Rubinate ® 44 | 217.5 | 14.5 | 217.5 | 14.5 | 210 | 14 | 200 | 13.3 |
| Rucoflex ® 8822A | | | | | 285 | 19 | 293 | 19.5 |
| Perenol ® F40 | 3 | 0.2 | 3 | 0.2 | | | | |
| FC-430 | 3 | 0.2 | 3 | 0.2 | | | | |
| Dibutyltin-dilaurate | 0.3 | 0.02 | 0.3 | 0.02 | | | | |
| NCO % | | 1.8 | | 1.9 | | 2.0 | | 1.7 |
| Viscosity @ 250° F. (cps) | 15,000 | | 12,500 | | 7,000 | | 19,000 | |
| RT Bond Strength | good | | not good | | good | | not good | |

Examples 1 and 2 and Comparative Examples 1 and 2 were applied to ABS substrates from Spartech Plastics or Gage Plastics and evaluated for room temperature adhesion. The adhesives of Examples 1 and 2 exhibited strong bonds at 1 day, whereas even at 3 days after application the adhesives of Comparative Examples 1 and 2 were unable to form a strong bond with ABS. These data demonstrate that the presence of phthalic acid or its anhydride in the polyester polyol component deleteriously affects the performance of the adhesive. The use of polyester polyols substantially free of phthalic acid or its anhydride leads to an adhesive capable of bonding to low surface energy difficult-to-bond ABS substrates.

TABLE II

| Component | Example 3 Wt.(g) | Example 3 Wt. % | Example 4 Wt.(g) | Example 4 Wt. % | Example 5 Wt.(g) | Example 5 Wt. % | Example 6 Wt.(g) | Example 6 Wt. % | Example 7 Wt.(g) | Example 7 Wt. % |
|---|---|---|---|---|---|---|---|---|---|---|
| Rucoflex ® S1014-55 | 592 | 29.6 | 480 | 24 | 480 | 24 | 561 | 37.4 | | |
| Arcol ® PPG 2025 | 296 | 14.8 | 200 | 10 | 200 | 10 | 210 | 14 | | |
| Epon ® 828 | | | | | | | 120 | 8 | | |
| Dynacoll ® 7250 | 354 | 17.7 | 280 | 14 | 280 | 14 | | | 280 | 14 |
| Dynacoll ® 7340 | | | | | | | | | 480 | 24 |
| Dynacoll ® 7360 | 304 | 15.2 | 534 | 26.7 | 630 | 31.5 | 240 | 16 | 630 | 31.5 |
| Dynacoll ® 7380 | 188 | 9.4 | 260 | 13 | 160 | 8 | | | 160 | 8 |
| Pearlstick ® 508 | | | | | | | 159 | 10.6 | | |
| Rubinate ® 44 | 266 | 13.3 | 246 | 12.3 | 250 | 12.5 | 204 | 13.6 | 250 | 12.5 |
| Perenol ®-430 | | | | | | | 3 | 0.2 | | |
| FC-430 | | | | | | | 3 | 0.2 | | |
| NCO % | | 1.78 | | 1.59 | | 1.66 | | 2.43 | | 2.09 |
| Viscosity @ 250° F. (cps) | 10,000 | | 12,500 | | 8,750 | | 10,000 | | 7,000 | |
| Bond Strength | RT good LT good HT good | | RT good LT good HT good | | RT good LT good HT good | | RT good (PP, PE, Al, Steel) | | LT almost good | |
| Open Time | | | 1 min | | 2 min | | | | | |

Examples 3–6 in Table II demonstrate how the formulations can be optimized for other such commercial considerations as viscosity, green strength, open time and adhesion to other substrates. Example 3 demonstrates the optimization of viscosity by adjusting the relative amounts of each of the polyols used in the formulation. Example 3 also demonstrates the ability of the adhesive to bond ABS substrates from Spartan Plastics or Gage Plastics at a variety of temperatures. Example 4 demonstrates the ability to provide for higher green strength and one minute open time by increasing the relative amounts of Dynacoll® 7360 and Dynacoll® 7380. Example 5 demonstrates longer open time compared to Example 4 through the increase in the relative amount of Dynacoll® 7360 and the concurrent decrease in Dynacoll® 7380. Example 6 demonstrates how the addition of epoxy resin such as EPON® 828 provides good adhesion to polypropylene (PP) and polyethylene (PE) as well as aluminum (Al) and steel. Example 7 demonstrates how the use of a polyester polyol derived from the reaction of terephthalic instead of isophthalic acid with a diol produces acceptable although not as good results as the other examples.

What is claimed is:

1. A moisture curable polyurethane hot melt adhesive composition comprising:

an epoxy resin, and
a polyurethane prepolymer which is the reaction product of a polyol component and a polyisocyanate component, wherein said polyol component comprises a polyester polyol which is the reaction product of diacid and diol, said diacid comprising aromatic diacid and optional co-monomer diacid(s), with the proviso that said diacid is substantially free of phthalic acid or derivatives thereof, wherein said derivatives are selected from the group consisting of anhydrides, halides and alkyl esters.

2. The composition of claim 1 wherein the aromatic diacid is selected from the group consisting of isophthalic acid, terephthalic acid, derivatives thereof, and mixtures thereof, wherein said derivatives are selected from the group consisting of anhydrides, halides and alkyl esters thereof.

3. The composition of claim 1 wherein the aromatic diacid is isophthalic acid.

4. The composition of claim 1 wherein co-monomer diacid is selected from the group consisting of aliphatic diacid and cycloaliphatic diacid.

5. The composition of claim 1 wherein the co-monomer diacid is aliphatic diacid.

6. The composition of claim 4 wherein the aliphatic diacid is selected from the group consisting of dodecanedioic acid, succinic acid, glutaric acid, adipic acid, azelaic acid, sebacic acid, decanedicarboxylic acid, octadecanedicarboxylic acid, 1,4-cyclohexanedicarboxylic acid, dimerized fatty acids, fumaric acid, and derivatives thereof, wherein said derivatives are selected from the group consisting of anhydrides, halides and alkyl esters thereof.

7. A moisture curable polyurethane hot melt adhesive composition comprising a polyurethane prepolymer which is the reaction product of a polyol component and a polyisocyanate component, wherein said polyol component comprises a polyester polyol which is the reaction product of diacid and diol, said diacid comprising aromatic diacid and optional co-monomer diacid(s), with the proviso that said diacid is substantially free of phthalic acid or derivatives thereof, wherein said derivatives are selected from the group consisting of anhydrides, halides, and alkyl esters thereof, wherein the co-monomer diacid is selected from the group consisting of aliphatic diacid and cycloaliphatic diacid, and wherein the cycloaliphatic diacid is selected from the group consisting of 1,3-cyclohexane dicarboxylic acid and 1,4-cyclohexanedicarboxylic acid.

8. The composition of claim 1 wherein the aromatic diacid is isophthalic acid and the co-monomer diacid is adipic acid.

9. The composition of claim 8 wherein the weight ratio of isophthalic acid to adipic acid is from about 30:70 to about 70:30, based on the combined weight of isophthalic acid and adipic acid.

10. A moisture curable polyurethane hot melt adhesive composition comprising a polyurethane prepolymer which is the reaction product of a polyol component and a polyisocyanate component, wherein said polyol component comprises a polyester polyol which is the reaction product of diacid and diol, said diacid comprising aromatic diacid and optional co-monomer diacid(s), with the proviso that said diacid is substantially free of phthalic acid or derivatives thereof, wherein said derivatives are selected from the group consisting of anhydrides, halides, and alkyl esters thereof, wherein the aromatic diacid is isophthalic acid and the co-monomer diacid is adipic acid, and wherein the weight ratio of isophthalic acid and adipic acid is about 50:50, based on the combined weight of isophthalic acid and adipic acid.

11. The composition of claim 1 wherein the diol is selected from the group consisting of ethylene glycol, 1,2-propanediol, 1,3-propanediol, 1,3-butanediol, 1,5-pentanediol, 1,4-hexanediol, 1,6-hexanediol, 1,10-decandediol, neopentyl glycol, diethylene glycol, polyethylene glycol, dipropylene glycol, polypropylene glycol, 1,4-cyclohexane dimethanol, 1,4cyclohexanediol, bisphenol-A, bisphenol-F, hydrogenated bisphenol-A, hydrogenated bisphenol-F, and mixtures thereof.

12. The composition of claim 8 wherein the diol comprises 1,6-hexandiol.

13. The composition of claim 1 wherein the polyisocyanate component is a diisocyanate.

14. The composition of claim 13 wherein the diisocyanate is selected from the group consisting of 1,4-diisocyanatobenzene (PPDI), toluene diisocyanate (TDI), 4,4'-diphenylmethane diisocyanate) (MDI), 4,4'-MDI,2,4'-MDI isomer mixture, polymethylene poly(phenyl isocyanate) (PMDI), 1,5-naphthalene diisocyanate (NDI), bitolylene diisocyanate (TODI), 1,3-xylene diisocyanate (XDI),p-1,1,4,4-tetramethylxylene diisocyanate (p-TMXDI), m-1,1,3,3-tetramethylxylylene diisocyanate (m-TMXDI), 1,6-diisocyanato-2,4,4trimethylhexane, 1,4cyclohexane diisocyanate (CHDI), 1,4-cyclohexanebis (methylene isocyanate) (BDI), 1,3-bis(isocyanatomethyl) cyclohexane ($H_6$XDI), 3-isocyanatomethyl-3,5,5-trimethylcyclohexyl isocyanate (IPDI), dicyclohexylmethane diisocyanate ($H_{12}$MDI).

15. The composition of claim 13 wherein the polyisocyanate is 4,4'-diphenylmethane diisocyanate.

16. The composition of claim 1 further comprising crystalline polyester polyol.

17. The composition of claim 16 wherein the crystalline polyester polyol comprises the reaction product of an aliphatic diol having from 2 to 10 methylene groups and an aliphatic diacid having from 2 to 10 methylene groups.

18. The composition of claim 17 wherein the aliphatic diol is selected from the group consisting of ethylene glycol, 1,4-butanediol, 1,5-pentanediol, 1,6-hexanediol, 1,8-octanediol, 1,10-decanediol, 1,4-cyclohexanediol and 1,4-cyclohexanedimethanol.

19. The composition of claim 17 wherein the aliphatic diacid is selected from the group consisting of succinic acid, glutaric acid, adipic acid, sebacic acid, 1,12-dodecanedioic acid, dimerized fatty acids, and derivatives thereof, wherein said derivatives are selected from the group consisting of anhydrides, halides and alkyl esters thereof.

20. The composition of claim 16 wherein the crystalline polyester polyol is selected from the group consisting of polyhexanediol adipate) polyol, poly(butanediol adipate) polyol, poly ε-caprolactone, and polyhexanediol dodecanedioic acid) polyol.

21. A moisture curable polyurethane hot melt adhesive composition comprising a polyurethane prepolymer which is the reaction product of a polyol component and a polyisocyanate component, wherein said polyol component comprises a polyester polyol which is the reaction product of diacid and diol, said diacid comprising aromatic diacid and optional co-monomer diacid(s), with the proviso that said diacid is substantially free of phthalic acid or derivatives thereof, wherein said derivatives are selected from the group consisting of anhydrides, halides and alkyl esters thereof, and wherein said composition further includes poly ε-caprolactone polyol.

22. The composition of claim 16 wherein the crystalline polyester polyol comprises the reaction product of hexanediol and dodecanedioic acid.

23. The composition of claim 1 further comprising flexible polyol which is liquid at 25° C. and has a glass transition temperature below 25° C.

24. The composition of claim 23 wherein the flexible polyol is selected from the group consisting of polyether polyols, polyester polyols, and mixtures thereof.

25. A moisture curable polyurethane hot melt adhesive composition comprising a polyurethane prepolymer which is the reaction product of a polyol component and a polyisocyanate component, wherein said polyol component comprises a polyester polyol which is the reaction product of diacid and diol, said diacid comprising aromatic diacid and optional co-monomer diacid(s), with the proviso that said diacid is substantially free of phthalic acid or derivatives thereof, wherein said derivatives are selected from the group consisting of anhydrides, halides and alkyl esters thereof, wherein said composition further includes a polyol selected from the group consisting of polyether polyols, polyester polyols, and mixtures thereof, and wherein the polyether polyol is selected from the group consisting of polyethylene glycol, polytetramethylene glycol, polypropylene glycol and polybutadiene diol.

26. The composition of claim 24 wherein the flexible polyester polyol comprises the reaction product of an aliphatic diol and a diacid.

27. The composition of claim 26 wherein the aliphatic diol is selected from the group comprising ethylene glycol ,diethylene glycol, propylene glycol, 1,4-butanediol, neopentyl glycol, 1,6-hexanediol, and 2-methylpropanediol.

28. The composition of claim 26 wherein the diacid is selected from the group consisting of adipic acid, isophthalic acid, and terephthalic acid.

29. The composition of claim 24 wherein the flexible polyester polyol is the reaction product of hexanediol, neopentyl glycol, and adipic acid.

30. The composition of claim 1 further comprising amorphous polyester polyol.

31. The composition of claim 30 wherein the amorphous polyester polyol comprises the reaction product of an aliphatic diol and a diacid.

32. The composition of claim 31 wherein the aliphatic diol is selected from the group comprising ethylene glycol, diethylene glycol, propylene glycol, 1,4-butanediol, neopentyl glycol, 1,6-hexanediol, and 2-methylpropanediol.

33. The composition of claim 31 wherein the diacid is selected from the group consisting of adipic acid, isophthalic acid, and terephthalic acid.

34. The composition of claim 1 wherein the epoxy resin is selected from the group consisting of phenolic epoxy resins, bisphenol epoxy resins, hydrogenated epoxy resins, halogenated bisphenol epoxy resins, novolac epoxy resins, and mixtures thereof.

35. The composition of claim 1 wherein the epoxy resin is formed by the reaction product of bisphenol-A with epichlorohydrin.

36. A moisture curable polyurethane hot melt adhesive comprising a polyurethane prepolymer which is the reaction product of a polyol component and a polyisocyanate component, wherein the polyol component comprises (i) a polyester polyol which is the reaction product of diacid and diol, said diacid comprising aromatic diacid and optional co-monomer diacid, with the proviso that said diacid is substantially free of phthalic acid or derivative thereof, wherein said derivative is selected from the group consisting of anhydride, halide and alkyl ester thereof, and (ii) at least one polyol selected from the group consisting of crystalline polyol which is solid at 25° C. and has a glass transition temperature below 0° C., flexible polyol which is liquid at 25° C. and has a glass transition temperature below 250° C., and amorphous polyester polyol which is solid at 25° C. and has a glass transition temperature above 0° C.

37. A method of bonding a substrate which comprises applying to the substrate a moisture curable polyurethane hot melt adhesive composition comprising a polyurethane prepolymer which is the reaction product of a polyol component and a polyisocyanate component, wherein said polyol component comprises a polyester polyol which is the reaction product of diacid and diol, said diacid comprising aromatic diacid and optional co-monomer diacid(s), with the proviso that said diacid is substantially free of phthalic acid or derivatives thereof.

38. The method of claim 37 wherein the substrate is selected from the group consisting of polyethylene, polypropylene, acrylonitrile-butadiene-styrene, fiber-reinforced plastic, plywood, paper board, aluminum, and steel.

39. The method of claim 37 wherein the aromatic diacid is selected from the group consisting of isophthalic acid, terephthalic acid, derivatives thereof, and mixtures thereof.

40. The method of claim 37 wherein the aromatic diacid is isophthalic acid.

41. The method of claim 37 wherein co-monomer diacid is selected from the group consisting of aliphatic diacid and cycloaliphatic diacid.

42. The method of claim 37 wherein the co-monomer diacid is aliphatic diacid.

43. The method of claim 43 wherein the aliphatic diacid is selected from the group consisting of succinic acid, glutaric acid, adipic acid, azelaic acid, sebacic acid, decanedicarboxylic acid, octadecanedicarboxylic acid, 1,4-cyclohexanedicarboxylic acid, dimerized fatty acids, fumaric acid, and derivatives thereof.

44. The method of claim 41 wherein the cycloaliphatic diacid is selected from the group consisting of 1,3-cyclohexane dicarboxylic acid and 1,4-cyclohexanedicarboxylic acid.

45. The method of claim 37 wherein the aromatic diacid is isophthalic acid and the co-monomer diacid is adipic acid.

46. The method of claim 45 wherein the weight ratio of isophthalic acid to adipic acid is from about 30:70 to about 70:30, based on the combined weight of isophthalic acid and adipic acid.

47. The method of claim 45 wherein the weight ratio of isophthalic acid and adipic acid is about 50:50, based on the combined weight of isophthalic acid and adipic acid.

48. The method of claim 37 wherein the diol is selected from the group consisting of ethylene glycol, 1,2-propanediol, 1,3-propanediol, 1,3-butanediol, 1,5-pentanediol, 1,4-hexanediol, 1,6-hexanediol, 1,10-decandediol, neopentyl glycol, diethylene glycol, polyethylene glycol, dipropylene glycol, polypropylene glycol, 1,4-cyclohexane dimethanol, 1,4-cyclohexanediol, bisphenol-A, bisphenol-F, hydrogenated bisphenol-A, hydrogenated bisphenol-F, and mixtures thereof.

49. The method of claim 45 wherein the diol comprises 1,6-hexandiol.

50. The method of claim 37 wherein the polyisocyanate component is a diisocyanate.

51. The method of claim 50 wherein the diisocyanate is selected from the group consisting of 1,4-diisocyanatobenzene (PPDI), toluene diisocyanate (TDI), 4,4'-diphenylmethane diisocyanate) (MDI), 4,4'-MDI, 2,4'-MDI isomer mixture, polymethylene poly(phenyl isocyanate) (PMDI), 1,5-naphthalene diisocyanate (NDI), bitolylene diisocyanate (TODI), 1,3-xylene diisocyanate (XDI), p-1,1,4,4-tetramethylxylene diisocyanate (TODI), m-1,1,3,3-tetramethylxylylene diisocyanate (m-TMXDI), 1,6-diisocyanato-2,4,4-trimethylhexane, 1,4-cyclohexane diisocyanate (CHDI), 1,4-cyclohexanebis(methylene isocyanate) (BDI), 1,3-bis(isocyanatomethyl)cyclohexane ($H_6$XDI), 3-isocyanatomethyl-3,5,5-trimethylcyclohexyl isocyanate (IPDI), dicyclohexylmethane diisocyanate ($H_{12}$MDI).

52. The method of claim 50 wherein the polyisocyanate is 4,4'- diphenylmethane diisocyanate.

53. The method of claim 37 wherein the composite further comprises crystalline polyester polyol.

54. The method of claim 53 wherein the crystalline polyester polyol comprises the reaction product of an aliphatic diol having from 2 to 10 methylene groups and an aliphatic diacid having from 2 to 10 methylene groups.

55. The method of claim 54 wherein the aliphatic diol is selected from the group consisting of ethylene glycol, 1,4-butanediol, 1,5-pentanediol, 1,6-hexanediol, 1,8-octanediol, 1,10-decanediol, 1,4-cyclohexanediol and 1,4-cyclohexanedimethanol.

56. The method of claim 54 wherein the aliphatic diacid is selected from the group consisting of succinic acid, glutaric acid, adipic acid, sebacic acid, 1,12-dodecanedioic acid, dimerized fatty acids, and derivatives thereof.

57. The method of claim 53 wherein the crystalline polyester polyol is selected from the group consisting of poly(hexanediol adipate) polyol, poly(butanediol adipate) polyol, poly ϵ-caprolactone, and polyhexanediol dodecanedioic acid) polyol.

58. The method of claim 53 wherein the crystalline polyester polyol is poly ϵ-caprolactone polyol.

59. The method of claim 53 wherein the crystalline polyester polyol comprises the reaction product of hexanediol and dodecanedioic acid.

60. The method of claim 37 wherein the composite further comprises flexible polyol.

61. The method of claim 60 wherein the flexible polyol is selected from the group consisting of polyether polyols, polyester polyols, and mixtures thereof.

62. The method of claim 61 wherein the polyether polyol is selected from the group consisting of polyethylene glycol, polytetramethylene glycol, polypropylene glycol, and polybutadiene diol.

63. The method of claim 61 wherein the flexible polyester polyol comprises the reaction product of an aliphatic diol and a diacid.

64. The method of claim 63 wherein the aliphatic diol is selected from the group comprising ethylene glycol, diethylene glycol, propylene glycol, 1,4-butanediol, neopentyl glycol, 1,6-hexanediol, and 2-methylpropanediol.

65. The composition of claim 63 wherein the diacid is selected from the group comprising adipic acid, isophthalic acid, phthalic acid or the anhydride thereof, and terephthalic acid.

66. The method of claim 61 wherein the flexible polyester polyol is the reaction product of hexanediol, neopentyl glycol, and adipic acid.

67. The method of claim 37 wherein the composition further comprises amorphous polyester polyol.

68. The method of claim 67 wherein the amorphous polyester polyol comprises the reaction product reaction product of an aliphatic diol and a diacid.

69. The method of claim 68 wherein the aliphatic diol is selected from the group comprising ethylene glycol, diethylene glycol, propylene glycol, 1,4-butanediol, neopentyl glycol, 1,6-hexanediol, and 2-methylpropanediol.

70. The composition of claim 36 wherein the amorphous polyester polyol comprises the reaction product of an aliphatic diol and a diacid selected from the group consisting of adipic acid, isophthalic acid, and terephthalic acid.

71. The method of claim 37 wherein the composition further comprises epoxy resin.

72. The method of claim 71 wherein the epoxy resin is selected from the group consisting of phenolic epoxy resins, bisphenol epoxy resins, hydrogenated epoxy resins, halogenated bisphenol epoxy resins, novolac epoxy resins, and mixtures thereof.

73. The method of claim 71 wherein the epoxy resin is formed by the reaction product of bisphenol-A with epichlorohydrin.

74. The composition of claim 7 wherein the aromatic diacid is selected from the group consisting of isophthalic acid, terephthalic acid and derivatives thereof, wherein said derivatives are selected from the group consisting of anhydrides, halides and alkyl esters thereof.

75. The composition of claim 7 wherein the aromatic diacid is isophthalic acid.

76. The composition of claim 7 wherein the diol is selected from the group consisting of ethylene glycol, 1,2-propanediol, 1,3-butanediol, 1,5-pentanediol, 1,4-hexanediol, 1,6-hexanediol, 1,10-decanediol, neopentyl glycol, diethylene glycol, polyethylene glycol, dipropylene glycol, polypropylene glycol, 1,4-cyclohexane dimethanol, 1,4-cyclohexanediol, bisphenol-A, bisphenol-F, hydrogenated bisphenol-A, hydrogenated bisphenol-F, and mixtures thereof.

77. The composition of claim 7 wherein the polyisocyanate component is a diisocyanate.

78. The composition of claim 77 wherein the diisocyanate is selected from the group consisting of 1,4-diisocyanatobenzene (PPDI), toluene diisocyanate (TDI3, 4,4'-diphenylmethane diisocyanate (MDI), 4,4'-MDI, 2,4'-MDI isomer mixture, polymethylene poly (phenyl isocyanate) (PMDI), 1,5-naphthalene diisocyanate (NDI), bitolylene diisocyanate (TODI), 1,3-xylene diisocyanate (XDI), ρ-1,1,4,4-tetramethylxylene diisocyanate (ρ-TMXDI), m-1,1,3,3-tetramethylxylylene diisocyanate (m-TMXDI), 1,6-diisocyanato-2,4,4-trimethylhexane, 1,4-cyclohexane diisocyanate (CHDI), 1,4-cyclohexane bis(methylene isocyanate) (BDI), 1,3-bis(isocyanatomethyl) cyclohexane ($H_6XDI$), 3-isocyanatomethyl-3,5-5-trimethylcyclohexyl isocyanate (IPDI), dicyclohexylmethane diisocyanate ($H_{12}MDI$).

79. The composition of claim 77 wherein the diisocyanate is diphenylmethane diisocyanate.

80. The composition of claim 7 further including an epoxy resin.

81. The composition of claim 80 wherein said epoxy resin is formed by the reaction product of bisphenol-A with epichlorohydrin.

82. The composition of claim 10 wherein the diol is selected from the group consisting of ethylene glycol, 1,2-propanediol, 1,3-butanediol, 1,5-pentanediol, 1,4-hexanediol, 1,6-hexanediol, 1,10-decanediol, neopentyl glycol, diethylene glycol, polyethylene glycol, dipropylene glycol, polypropylene glycol, 1,4-cyclohexane dimethanol, 1,4-cyclohexanediol, bisphenol-A, bisphenol-F, hydrogenated bisphenol-A, hydrogenated bisphenol-F, and mixtures thereof.

83. The composition of claim 10 wherein the polyisocyanate component is a diisocyanate.

84. The composition of claim 83 wherein the diisocyanate is selected from the group consisting of 1,4-diisocyanatobenzene (PPDI), toluene diisocyanate (TDI), 4,4'-diphenylmethane diisocyanate (MDI), 4,4'-MDI,2,4'-MDI isomer mixture, polymethylene poly (phenyl isocyanate) (PMDI), 1,5-naphthalene diisocyanate (NDI), bitolylene diisocyanate (TODI), 1,3-xylene diisocyanate (XDI), ρ-1,1,4,4-tetramethylxylene diisocyanate (ρ-TMXDI), m-1,1,3,3-tetramethylxylylene diisocyanate (m-TMXDI), 1,6-diisocyanato-2,4,4-trimethylhexane, 1,4-cyclohexane diisocyanate (CHDI), 1,4-cyclohexane bis(methylene isocyanate) (BDI), 1,3-bis(isocyanatomethyl) cyclohexane ($H_6XDI$), 3-isocyanatomethyl-3,5-5-trimethylcyclohexyl isocyanate (IPDI), dicyclohexylmethane diisocyanate ($H_{12}MDI$).

85. The composition of claim 83 wherein the diisocyanate is diphenylmethane diisocyanate.

86. The composition of claim 10 further including an epoxy resin.

87. The composition of claim 86 wherein said epoxy resin is formed by the reaction product of bisphenol-A with epichlorohydrin.

88. The composition of claim 21 wherein the aromatic diacid is selected from the group consisting of isophthalic acid, terephthalic acid and derivatives thereof, wherein said derivatives are selected from the group consisting of anhydrides, halides and alkyl esters thereof.

89. The composition of claim 21 wherein the aromatic diacid is isophthalic acid.

90. The composition of claim 21 wherein the diol is selected from the group consisting of ethylene glycol, 1,2-propanediol, 1,3-butanediol, 1,5-pentanediol, 1,4-hexanediol, 1,6-hexanediol, 1,10-decanediol, neopentyl glycol, diethylene glycol, polyethylene glycol, dipropylene glycol, polypropylene glycol, 1,4-cyclohexane dimethanol, 1,4-cyclohexanediol, bisphenol-A, bisphenol-F, hydrogenated bisphenol-A, hydrogenated bisphenol-F, and mixtures thereof.

91. The composition of claim 21 wherein the polyisocyanate component is a diisocyanate.

92. The composition of claim 91 wherein the diisocyanate is selected from the group consisting of
1,4-diisocyanatobenzene (PPDI), toluene diisocyanate (TDI), 4,4'-diphenylmethane diisocyanate (MDI), 4,4'-MDI,2,4'-MDI isomer mixture, polymethylene poly (phenyl isocyanate) (PMDI), 1,5-naphthalene diisocyanate (NDI), bitolylene diisocyanate (TODI), 1,3-xylene diisocyanate (XDI), p-1,1,4,4-tetramethylxylene diisocyanate (p-TMXDI), m-1,1,3,3-tetramethylxylylene diisocyanate (m-TMXDI), 1,6-diisocyanato-2,4,4-trimethylhexane, 1,4-cyclohexane diisocyanate (CHDI), 1,4-cyclohexane bis(methylene isocyanate) (BDI), 1,3-bis (isocyanatomethyl) cyclohexane ($H_6XDI$), 3-isocyanatomethyl-3,5-5-trimethylcyclohexyl isocyanate (IPDI), dicyclohexylmethane diisocyanate ($H_{12}MDI$).

93. The composition of claim 91 wherein the diisocyanate is diphenylmethane diisocyanate.

94. The composition of claim 21 further including an epoxy resin.

95. The composition of claim 94 wherein said epoxy resin is formed by the reaction product of bisphenol-A with epichlorohydrin.

96. The composition of claim 25 wherein the aromatic diacid is selected from the group consisting of isophthalic acid, terephthalic acid and derivatives thereof, wherein said derivatives are selected from the group consisting of anhydrides, halides and alkyl esters thereof.

97. The composition of claim 25 wherein the aromatic diacid is isophthalic acid.

98. The composition of claim 25 wherein the polyisocyanate component is a diisocyanate.

99. The composition of claim 98 wherein the diisocyanate is selected from the group consisting of
1,4-diisocyanatobenzene (PPDI), toluene diisocyanate (TDI), 4,4'-diphenylmethane diisocyanate (MDI), 4,4'-MDI,2,4'-MDI isomer mixture, polymethylene poly (phenyl isocyanate) (PMDI), 1,5-naphthalene diisocyanate (NDI), bitolylene diisocyanate (TODI), 1,3-xylene diisocyanate (XDI), p-1,1,4,4-tetramethylxylene diisocyanate (p-TMXDI), m-1,1,3,3-tetramethylxylylene diisocyanate (m-TMXDI), 1,6-diisocyanato-2,4,4-trimethylhexane, 1,4-cyclohexane diisocyanate (CHDI), 1,4-cyclohexane bis(methylene isocyanate) (BDI), 1,3-bis (isocyanatomethyl) cyclohexane ($H_6XDI$), 3-isocyanatomethyl-3, 5-5-trimethylcyclohexyl isocyanate (IPDI), dicyclohexylmethane diisocyanate ($H_{12}MDI$).

100. The composition of claim 98 wherein the diisocyanate is diphenylmethane diisocyanate.

101. The composition of claim 25 further including an epoxy resin.

102. The composition of claim 101 wherein said epoxy resin is formed by the reaction product of bisphenol-A with epichlorohydrin.

103. The adhesive of claim 36 wherein said crystalline polyol is selected from the group consisting of crystalline polyester polyol and crystalline polyurethane polyol.

104. The adhesive of claim 103 wherein the crystalline polyester polyol comprises a reaction product of an aliphatic diol having from 2 to 10 methylene groups and an aliphatic diacid having from 2 to 10 methylene groups.

105. The adhesive of claim 104 wherein the aliphatic diol is a compound selected from the group consisting of ethylene glycol, 1,4-butanediol, 1,5-pentanediol, 1,6-hexanediol, 1,8-octanediol, 1,10-decanediol, 1,4-cyclohexanediol and 1,4-cyclohexanedimethanol, and wherein the aliphatic diacid is a compound selected from the group consisting of succinic acid, glutaric acid, adipic acid, sebacic acid, 1,2-dodecanedioic acid and dimerized fatty acid.

106. The adhesive of claim 104 wherein the crystalline polyester polyol is a compound selected from the group consisting of poly(hexanediol adipate) polyol, poly (butanediol adipate) polyol, poly ε-caprolactone polyol and poly(hexanediol dodecanedioic acid) polyol.

107. The adhesive of claim 103 wherein the crystalline polyurethane polyol comprises the reaction product of polycaprolactone with a stoichiometric amount of MDI.

108. The adhesive of claim 36 wherein said flexible polyol comprises the reaction product of a diol selected from the group consisting of hexanediol, butanediol, neopentyl glycol, ethylene glycol, diethylene glycol, propylene glycol and 2-methylpropanediol, and a diacid selected from the group consisting of adipic acid, isophthalic acid and terephthalic acid.

109. The adhesive of claim 36 wherein the flexible polyol is selected from the group consisting of polyethylene glycol, polytetramethylene glycol, polypropylene glycol and polybutadiene glycol.

110. The adhesive of claim 36 wherein the amorphous polyester polyol is a reaction product of a diol selected from the group consisting of hexanediol, butanediol, neopentyl glycol, ethylene glycol, diethylene glycol, propylene glycol and 2-methylpropanediol, and a diacid selected from the group consisting of adipic acid, isophthalic acid and terephthalic acid.

* * * * *

UNITED STATES PATENT AND TRADEMARK OFFICE
CERTIFICATE OF CORRECTION

PATENT NO. : 6,221,978 B1  Page 1 of 1
DATED : April 24, 2001
INVENTOR(S) : Li et al.

It is certified that error appears in the above-identified patent and that said Letters Patent is hereby corrected as shown below:

Column 11,
Line 52, delete "1,6-diisocyanato-2,4,4trimethylhexane", and insert therefor
-- 1,6-diisocyanato-2,4,4-trimethylhexane --
Line 53, delete "1,4cyclohexane", and insert therefor -- 1,4-cyclohexane --

Column 12,
Lines 12 and 13, delete "polyhexanediol", and insert therefor -- poly(hexanediol --.

Column 13,
Line 28, delete "250°'", and insert therefor -- 25° --.
Line 56, delete "claim 43", and insert therefor -- claim 42 --.

Column 14,
Line 28, after "p-1,1,4,4-tetramethylxylene diisocyanate", delete "(TODI)" and insert therefor -- (p-TMXDI) --
Line 56, delete "polyhexanediol", and insert therefor -- poly(hexanediol --

Column 15,
Line 63, delete "(TDI3", and insert therefor -- (TDI) --

Signed and Sealed this

Seventeenth Day of June, 2003

JAMES E. ROGAN
*Director of the United States Patent and Trademark Office*